United States Patent [19]
Hoglin

[11] Patent Number: 5,949,477
[45] Date of Patent: Sep. 7, 1999

[54] THREE DIMENSIONAL STEREOSCOPIC TELEVISION SYSTEM

[76] Inventor: Irving M. Hoglin, 2406 Palos Verdes Dr. West, #4, Palos Verdes Estates, Calif. 90274

[21] Appl. No.: 08/878,833

[22] Filed: Jun. 19, 1997

Related U.S. Application Data

[63] Continuation-in-part of application No. 08/417,980, Apr. 6, 1995, abandoned.

[51] Int. Cl.$^6$ .......................... H04N 13/02; H04N 15/00
[52] U.S. Cl. ............................ 348/47; 348/42; 396/325
[58] Field of Search ................................ 348/47, 42, 55, 348/57, 46, 48, 51; 352/57, 60; 359/477; 396/325, 329, 322; 74/840–842; H04N 13/02, 18/00

[56] References Cited

U.S. PATENT DOCUMENTS

| | | |
|---|---|---|
| 2,388,170 | 10/1945 | McCollum . |
| 2,417,446 | 3/1947 | Reynolds ................................. 348/42 |
| 2,545,465 | 3/1951 | Hough ..................................... 348/42 |
| 2,891,458 | 6/1959 | Grimal ..................................... 348/42 |
| 2,983,835 | 5/1961 | Frey, Jr. . |
| 3,052,754 | 9/1962 | Willaims ................................. 348/42 |
| 3,699,244 | 10/1972 | Cohen et al. . |
| 3,784,738 | 1/1974 | Natter ..................................... 348/42 |
| 3,858,001 | 12/1974 | Bonne . |
| 4,122,484 | 10/1978 | Tan . |
| 4,281,341 | 7/1981 | Byatt . |
| 4,431,265 | 2/1984 | Benton . |
| 4,431,290 | 2/1984 | Kennedy ................................. 354/113 |
| 4,504,856 | 3/1985 | Jackman . |
| 4,559,556 | 12/1985 | Wilkins . |
| 4,582,393 | 4/1986 | Shieman . |
| 4,654,872 | 3/1987 | Hisano et al. ............................ 348/42 |
| 4,719,482 | 1/1988 | Hora . |
| 4,719,507 | 1/1988 | Bos . |
| 4,725,863 | 2/1988 | Dumbreck et al. ...................... 354/113 |
| 4,734,756 | 3/1988 | Butterfield et al. . |
| 4,736,246 | 4/1988 | Nishikawa . |
| 4,751,570 | 6/1988 | Robinson ................................. 348/47 |
| 4,774,633 | 9/1988 | Sheiman . |
| 4,870,486 | 9/1989 | Nakagawa et al. . |
| 4,877,307 | 10/1989 | Kalmanash . |
| 5,003,385 | 3/1991 | Sudo . |
| 5,175,616 | 12/1992 | Milgram et al. ......................... 358/88 |
| 5,251,037 | 10/1993 | Busenberg . |

*Primary Examiner*—Wendy Garber
*Assistant Examiner*—Vincent F. Boccio
*Attorney, Agent, or Firm*—Blakely, Sokoloff, Taylor & Zafman LLP

[57] ABSTRACT

A three-dimensional stereoscopic system using two camera units mounted onto a sub-base and each camera unit mounted onto a moveable base. The bases rotates and are synchronized to turn with each other to control the horizontal viewing angle. Both camera units are synchronized to scan an image source in unison. The video signals from the camera units are loaded into a switching unit which alternatively outputs information from one camera unit and then the other camera unit. In this manner, both a left eye view and a right eye view are transmitted to a television monitor to be viewed as a stereoscopic image.

10 Claims, 4 Drawing Sheets

THREE DIMENSIONAL STEREOSCOPIC TELEVISION SYSTEM

This is a Continuation-in-Part of application Ser. No. 08/417,980, filed Apr. 6, 1995 now abandoned.

BACKGROUND OF THE INVENTION

1. Field of the Invention

The present invention relates to the field of communications. More particularity, the present invention relates to a stereoscopic television system producing images capable of being observed in three-dimensions on a television monitor.

2. Description of Prior Art

Modern television is based on well-established technology of converting light from a still or moving person, object, scene (hereinafter generally referred to as an "image source") into electrical signals. Such conversion is accomplished by a camera unit which subsequently transmits these electrical signals for (i) reconversion into visual images displayed on a television monitor screen or (ii) storage for later reconversion.

Various types of stereoscopic television systems have been proposed for providing a motion picture film, television broadcast and the like to be displayed in three-dimensions on a television monitor screen. These stereoscopic systems generally included a single camera capturing (e.g., converting visual images into information used for video display) two slightly displaced images of the image source. The slightly displaced images are simultaneously displayed on a single screen for observation by a viewer such that a left eye of the viewer observes only one of the two slightly displaced images while the viewer's right eye observes only the other displaced image.

One such conventional stereoscopic system is disclosed in U.S. Pat. No. 4,281,341 to Byatt. This stereophonic system discloses a transmitting subsystem including a single camera unit having a complicated stereoscope, consisting of a pair of lenses, mirrors and polarizers, which produces a composite image based on two images received through the pair of lenses. A liquid crystal cell is controlled by a frame rate switch which activates the liquid crystal cell on alternate frame periods. This allows the liquid crystal cell to exist in either (i) a "horizontal" polarization state allowing one of the images to propagate through an additional polarizer and into the single camera or (ii) a "vertical" polarization state allowing the other image to propagate as described above. The additional polarizer is used for filtering purposes.

However, a primary disadvantage encountered by this conventional stereoscopic system, as well as many other prior stereoscopic systems, is that it requires complete redesign of the camera unit. The cost to redesign a camera unit in order to implement this system would likely be prohibitive to local and privately-owned television stations. Another apparent disadvantage is that this conventional stereoscopic system polarizes light from the image source resulting in a poorer image quality due to inefficient light transmission (approximately 80% efficiency) to the camera image screen from the polarizers, placed between the image source and the camera image screen.

Previously, there has been efforts to provide a stereoscopic system utilizing a pair of camera units as shown in U.S. Pat. No. 4,122,484, issued to Tan. This stereoscopic system discloses a transmitting subsystem including a pair of camera units aimed horizontally at different angles to represent a certain viewpoint of a viewer. Each of the camera units individually produces an independent video signal, wherein both video signal are processed by a signal processing device to provide a composite video signal. The composite video signal is transmitted to a receiving subsystem including a customized three-dimensional television monitor having a projection display tube utilizing light polarizers or light-selecting filters in combination with a reflecting mirror.

Similar to the disadvantage associated with the stereoscopic system disclosed in Byatt, this stereoscopic system encounters the disadvantage in requiring complete redesign of standard television monitors. The implementation of this stereoscopic system would require a large capital investment by television manufacturers.

Hence, it would be advantageous to create a three-dimensional stereoscopic television system which does not require substantial modification of either a camera unit within a transmitting subsystem of the television system or a television monitor within a receiving subsystem of the television system.

BRIEF SUMMARY OF THE INVENTION

The present invention relates to a stereoscopic television system for providing three-dimensional television broadcasts without extensive modification and fabrication. The stereoscopic television system includes a transmitting subsystem and a receiving subsystem. The transmitting subsystem produces and subsequently outputs signals which are visually interpreted by a viewer as a three-dimensional reproduction of an image source. The transmitting subsystem includes (i) multiple camera units operating in unison and mounted on separate rotatable bases to adjust a horizontal viewing angle, and (ii) a switching unit continuously alternating receipt and transmission of electrical signals from a first camera unit and a second camera unit. The receiving subsystem receives signals broadcast from the transmitting subsystem for display on a television monitor. The alternating output produces a three dimensional effect.

BRIEF DESCRIPTION OF THE DRAWINGS

The features and advantages of the present invention will become apparent from the following detailed description of the present invention in which.

DETAILED DESCRIPTION OF THE INVENTION

The present invention relates to a stereoscopic television system and its associated method of operation directed to providing three-dimensional viewing of a television broadcast on a television monitor. In the following description, well-known devices are not described in detail in order to avoid unnecessarily obscuring the present invention.

Figure 1:
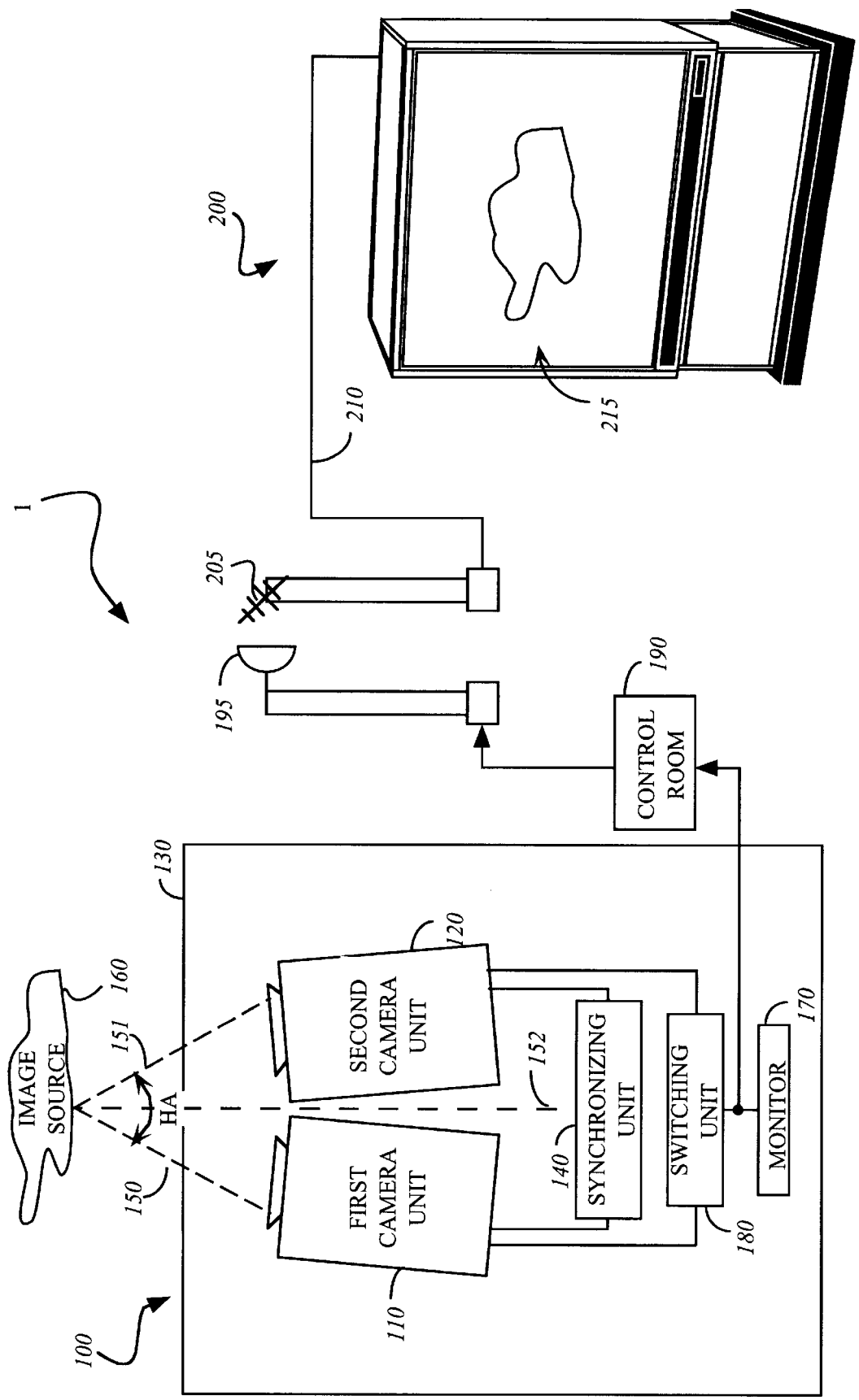
FIG. 1 is a overhead view of an embodiment of the stereoscopic television system illustrating both a transmitting subsystem and a receiving subsystem.

Referring to FIG. 1, an illustrative embodiment of a stereoscopic television system 1 comprising a transmitting subsystem 100 and a receiving subsystem 200. The transmitting subsystem 100 includes a first camera unit 110 and a second camera unit 120 which are separated by a distance approximating the typical eye separation of a person (e.g., approximately 1–6 inches). Mounted on a common sub-base 130, the first and second camera units 110 and 120 capture video by producing information for display purposes from visually perceived images, mainly through such techniques as scanning and the like. Each camera unit 110 and 120 may include, but is not limited or restricted to (i) a standard television camera utilizing well-known "orthicon camera tube" technology, and (ii) a camera unit utilizing "vidicon camera tube" technology as used by less expensive cameras. It is contemplated that standard digital camcorders, or any other suitable types of cameras may be implemented and used in lieu of cameras incorporating scanning logic.

Camera units 110 and 120 are controlled by a synchronizing unit 140, which allows camera units 110 and 120 to operate as a single, collective camera by supporting unison scanning. The synchronizing unit 140 is a well-known circuit, normally consisting of an oscillator which generates horizontal (HSYNC) and vertical (VSYNC) synchronizing signals at respective frequencies to support 2:1 interlace scanning.

Camera units 110 and 120 are positioned with a horizontal viewing angle (HA) defined by sight lines 150 and 151 intersected by a viewing angle 152. In order to compensate for location changes of image source 160, the horizontal viewing angle is appropriately adjusted by varying sight lines 150 and 151 of camera units 110 and 120. This requires camera units 110 and 120 to be situated so that they are generally parallel when scanning an image source 160 located in the distant horizon and are angled toward each other when scanning image source 160 in close proximity to camera units 110 and 120. Adjustment of HA may be accomplished manually by an operator of the camera units 110 and 120 viewing display monitor 170, or automatically by an auto-focusing device controlling a motor to adjust positioning of camera units 110 and 120.

A switching unit 180 (e.g., a video switcher as known in the art) receives information from first and/or second camera units 110 and 120. In this embodiment, the switching unit 180 separately engages each camera unit 110 or 120 for a defined period of time (e.g., 1/60 of a second) to allow of that camera unit 110 or 120 to output its captured video. This is accomplished by switching unit 180 detecting a voltage pulse (normally VSYNC) provided at the end of a captured field and engaging the other camera unit during retrace. For example, switching unit 180 switches to first camera unit 110 to download a field of video associated with image source 160. Next, switching unit 180 switches to second camera unit 120 to download a second field of video associated with image source 160, namely an interlaced video field of the first field of video, in order to complete a video frame. The alternating of camera unit outputs is performed in a continuous manner when multiple video frames are being supplied. Of course, two-dimensional viewing may be supported by receiving video from only one of the first and second camera units 110 and 120.

Referring still to FIG. 1, the scanned video fields are transmitted into a control room 190, in which appropriate modifications may be made to produce a transmission signal. The transmission signal may be modified for compliance with National Television System Committee (NTSC), Sequential Couleur Avec Memoire (SECAM), Phase Alternation Line (PAL), or any other transmission standard. The transmission signal is transferred to a transmitter 195 for transmission to the receiving subsystem 200. The receiving subsystem 200 includes a receiver 205 which receives and transfers the resultant transmission signal via transmission lines 210 to a television monitor 215 being well-known in the art. The television monitor 215 provides an image, representative of image source 160, which is perceived to be three-dimensional.

One embodiment of the operations of the camera units 110 and 120 is described below in which electrical scanning is used to capture data associated with the image source 160. During synchronous scanning, the switching unit 140 switches to one of camera units 110 or 120 to download a field of video. The video field is obtained from scanning for a defined period of time such as a scan period of approximately 1/60 of a second. The switching unit 180 then switches to the second camera unit 120 to download an interlace field of video in which these video fields form a video frame. This process continues for each successive pair of scanned video fields. The result is that a person viewing a television monitor sees either a left eye view or the right eye view for each scan period but never sees both views at the same time. The brain of the person senses these different images as depth perception to formulate three dimensional imagery.

Figure 2:
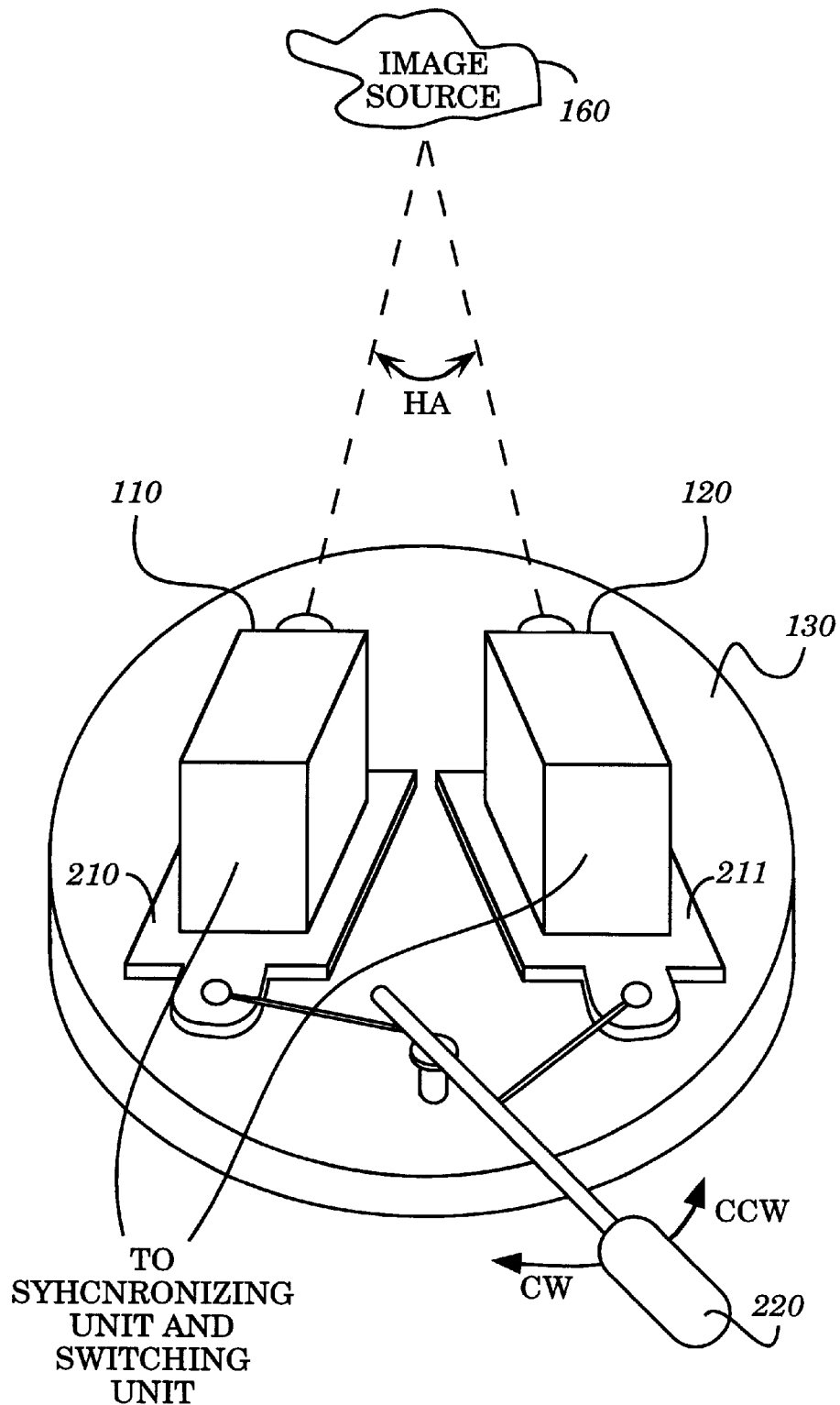
FIG. 2 is a first embodiment of a mechanism of the stereoscopic television system of FIG. 1 which appropriately adjusts a horizontal viewing angle of the camera units as an image source is moved.

Referring now to FIG. 2, a mechanism is illustrated which allows appropriate adjustment of the horizontal viewing angle (HA) for correctly capturing the image source 160 for three-dimensional viewing purposes. Camera units 110 and 120 are mounted onto respective bases 210 and 211 which are, in turn, mounted onto the preferably stationary common sub-base 130. Both bases 210 and 211 are capable of being rotated in a clockwise ("CW") or counter-clockwise ("CCW") direction. An operating level arm 220 is coupled to bases 210 and 211 in such a manner that adjustment of the lever arm 220 in the CW direction causes HA to increase as image source 160 is moving further away from camera units 110 and 120. Likewise, adjustment of the lever arm 220 in the CCW direction decreases HA as image source 160 approaches camera units 110 and 120. The rotation of bases 210 and 211 generally replicate movements of the human eyes. As previously mentioned, the display monitor 170 (FIG. 1) allows the camera operator to manually correct the horizontal viewing angle at all times.

Figure 3:
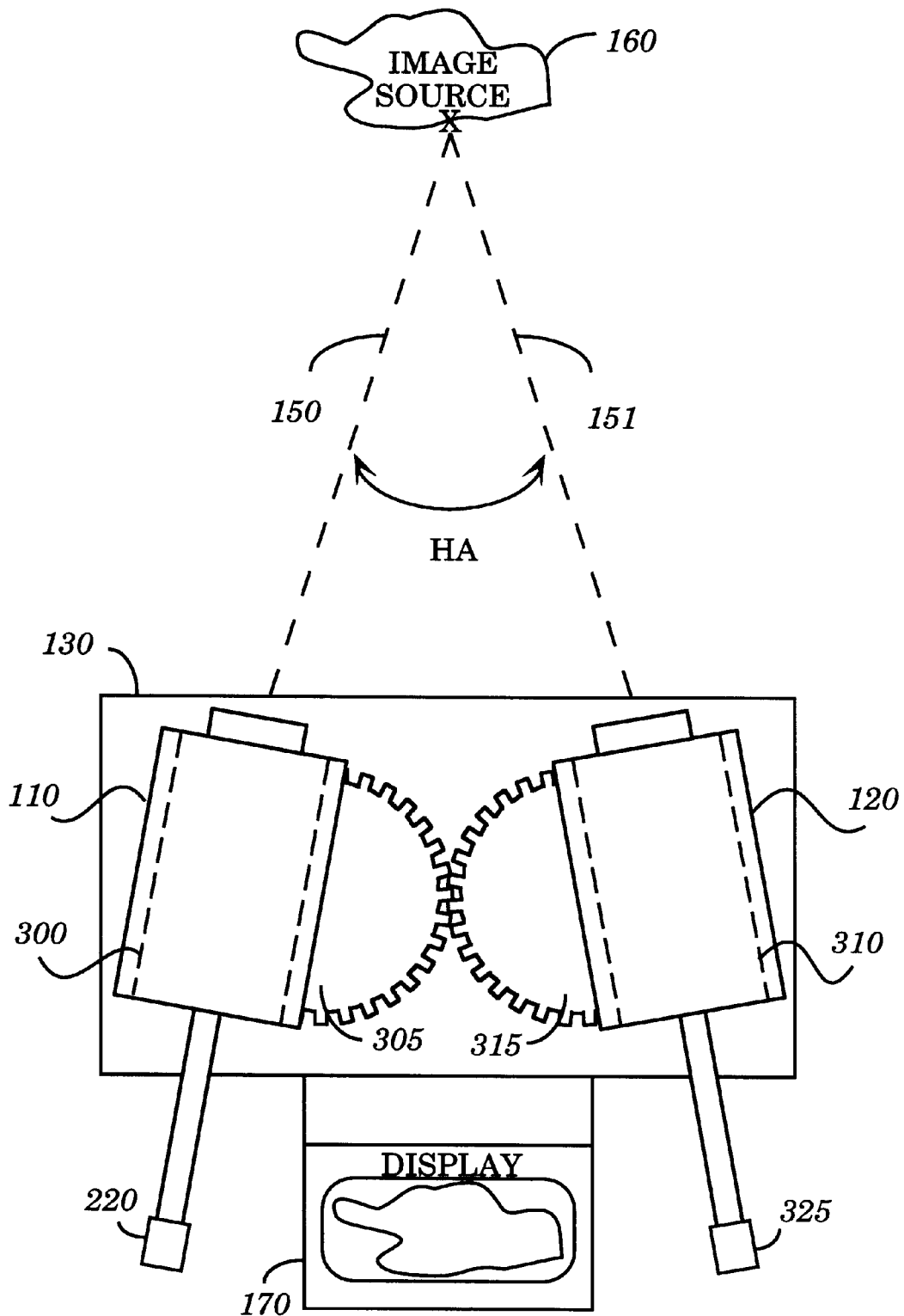
FIG. 3 is a second embodiment of a mechanism of the stereoscopic television system of FIG. 1 which appropriately adjusts a horizontal viewing angle of the camera units as an image source is moved.

Referring now to FIG. 3, another embodiment of the mechanism used to adjust horizontal viewing angle (HA) is shown. Camera units 110 and 120 are mounted on bases 300 and 310 that turn on a common pivot. Each of these bases 300 and 310 includes a gear 305 and 315 having gear teeth that mesh together. As a result, camera operator can adjust HA to correspond to a focal point of image source 160 moving along its viewing axis by pushing operating lever arms 320 and 325 together or apart along a longitudinal direction.

Figure 4:
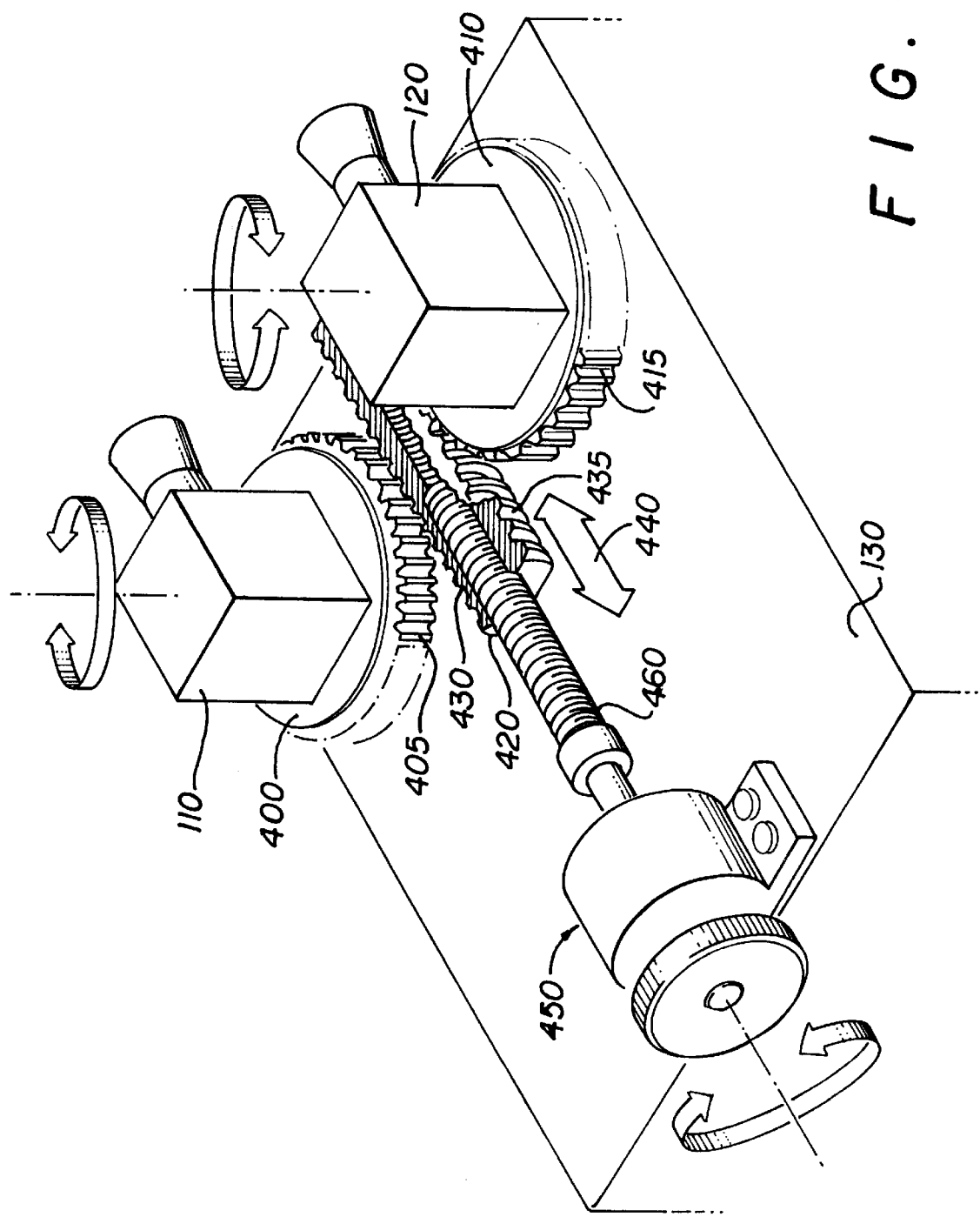
FIG. 4 is a third embodiment of a mechanism of the stereoscopic television system of FIG. 1 which appropriately adjusts a horizontal viewing angle of the camera units as an image source is moved.

Referring to FIG. 4, another embodiment of a mechanism used to adjust horizontal viewing angle (HA) is shown. Similar to FIG. 3, camera units 110 and 120 are mounted on bases 400 and 410, which are rotatable and separated from each other by approximately six inches or less. Each of these bases 400 and 410 includes grooves around its sides 405 and 415, respectively. A rotation bar 420 is inserted between the bases 400 and 410. The rotation bar 420 includes protrusions 430 and 435 which are complementary to those grooves in sides 405 and 415, respectively. Thus, by adjusting the rotation bar 420 along a lateral direction, represented by line 440, the horizontal viewing angle is appropriately adjusted. The lateral adjustment of rotation bar 420 is accomplished through a hand crank 450 connected to a guide bar 460 as shown or a motor coupled to the guide bar 460.

Of course, it is contemplated that there exists a number of mechanical and electrical devices which may be used to adjust the horizontal viewing angle other than those shown for illustrative purposes.

The present invention described herein may be designed to use many different configurations and in accordance to many different operations. While the present invention has been described in terms of various embodiments, other embodiments may come to mind to those skilled in the art without departing from the spirit and scope of the present invention. The invention should, therefore, be measured in terms of the claims which follow.

What is claimed is:

1. A stereoscopic television system comprising:
    a transmitting subsystem capable of producing and subsequently outputting a plurality of video frames collectively being an integral reproduction of an image source, the transmitting subsystem including
        a first camera unit to capture a first video field of the image source,
        a second camera unit to capture a second interlaced video field of the image source, the second camera unit being separated from the first camera unit by a predetermined distance to simulate a normal stereoscopic view,
        a base including (i) a first base having a top portion to support the first camera unit, (ii) a second base having a top portion to support the second camera unit, and (iii) a movable bar positioned between side portions of the first and second bases so that lateral adjustment of the moveable bar causes both the first base to rotate in a first direction about it axis and the second base to rotate in a direction opposite the first direction about axis, and
        a switching unit coupled to the first camera unit and the second camera unit, the switching unit downloads a video frame by alternatively receiving and outputting the first video field and the second interlaced video field; and
    a receiving subsystem coupled to the transmitting subsystem, the receiving subsystem displays the image source to be visually perceived in three dimensions.

2. The stereoscopic television system according to claim 1, wherein the predetermined distance is proximate to an average distance of eye separation for a person.

3. The stereoscopic television system of claim 2, wherein the transmitting system includes a synchronizing unit capable of allowing multiple camera units to operate and scan in unison.

4. The stereoscopic television system of claim 2, wherein the transmitting subsystem further includes a display monitor.

5. The stereoscopic television system of claim 2, wherein the first camera unit and the second camera unit are separated by a distance ranging from one inch to six inches.

6. A stereoscopic transmitting subsystem comprising:
    a base including a first rotational base, a second rotational base, and an operating lever arm coupled to both the first rotational base and the second rotational base, the operating lever arm, when adjusted, to cause both the first rotational base to rotate about its axis along a first direction and the second rotational base to rotate about its axis along a second direction along a direction opposite the first direction;
    a first camera unit coupled to the base, the first camera unit to capture a first video field of the image source;
    a second camera unit coupled to the base and separated from the first camera unit, the second camera unit to capture a second video field of the image source; and
    a switching unit coupled to the first camera unit and the second camera unit, the switching unit to produce a video frame by interlacing the first video field and the second video field in order to produce the image source for display in three dimensions.

7. The transmitting system of claim 6 further comprising a synchronizing unit to generate horizontal and vertical synchronization signals at their respective frequencies for 2:1 interlaced scanning.

8. A stereoscopic transmitting subsystem comprising:
    a first camera unit to capture a first video field of the image source;
    a second camera unit to capture a second video field of the image source; and
    a base including (i) a first base having a side portion and a top portion to support the first camera unit, (ii) a second base having a side portion and a top portion to support the second camera unit, and (iii) a movable bar adjacent to both the side portion of the first base and the side portion of the second base so that lateral adjustment of the moveable bar causes the first base to rotate in a first direction about its axis and the second base to rotate in a direction opposite the first direction about its axis; and
    a switching unit coupled to the first camera unit and the second camera unit, the switching unit to produce a video frame by interlacing the first video field and the second video field in order to produce the image for display in three dimensions.

9. The transmitting system of claim 8 further comprising a synchronizing unit to generate horizontal and vertical synchronization signals at their respective frequencies for 2:1 interlaced scanning.

10. The transmitting system of claim 8, wherein the reproduction of the image source is viewable in three dimensions without wearing polarized eyeglasses.

* * * * *